(12) United States Patent
Ito et al.

(10) Patent No.: US 6,190,286 B1
(45) Date of Patent: Feb. 20, 2001

(54) LINE PRESSURE CONTROLLER FOR AUTOMATIC TRANSMISSION AND METHOD THEREOF

(75) Inventors: Yoshiki Ito, Iwata; Akihiro Sugimoto, Hamamatsu, both of (JP)

(73) Assignee: Suzuki Motor Corporation (JP)

( * ) Notice: Under 35 U.S.C. 154(b), the term of this patent shall be extended for 0 days.

(21) Appl. No.: 09/456,671

(22) Filed: Dec. 9, 1999

(30) Foreign Application Priority Data

Dec. 10, 1998 (JP) .................................................. 10-351110

(51) Int. Cl.$^7$ .................................................. F16H 61/00
(52) U.S. Cl. .................................................. 477/160
(58) Field of Search .................... 477/133, 160; 701/51

(56) References Cited

U.S. PATENT DOCUMENTS

| 3,748,926 | * | 7/1973 | Mohri et al. ........................ | 477/160 |
| 4,488,456 | * | 12/1984 | Taga et al. ........................ | 477/133 |
| 4,955,259 | | 9/1990 | Narita . | |

FOREIGN PATENT DOCUMENTS

| 57-047056 | 3/1982 | (JP) . |
| 1-266352 | 10/1989 | (JP) . |

* cited by examiner

*Primary Examiner*—Dirk Wright
(74) *Attorney, Agent, or Firm*—Kilpatrick Stockton (57) ABSTRACT

The invention provides a hydraulic pressure control system for an automatic transmission and a method that enable a smooth kick-down from any accelerator (throttle) opening degree.

The hydraulic pressure control system comprises at least a throttle opening degree sensor (3), a vehicle speed sensor to detect a vehicle speed, a hydraulic (or oil) pressure controller (including device) (6) which receives signals (S3A, S3B, S4A, S4B) from sensors (3, 4), and a line pressure solenoid (14) which receives a signal (S9) from the hydraulic pressure controller (6). The hydraulic pressure controller (6) further comprises a throttle opening memory storage (including device) (8) for storing the signal S3B from the throttle opening degree sensor (3) and a line pressure controller (including device) to control a line pressure in shifting according to the throttle opening degree, stored by the throttle opening memory storage, before a predetermined period from a shift gear determination point. The system controls the line pressure in shifting according to the throttle opening degree before a predetermined period from a shift gear determination point and enables a smooth clutch engagement despite various throttle opening degrees before the shift gear determination point.

15 Claims, 6 Drawing Sheets

LINE PRESSURE CONTROLLER FOR AUTOMATIC TRANSMISSION AND METHOD THEREOF

BACKGROUND OF THE INVENTION

1. Field of the Invention

The present invention relates to an oil (or hydraulic) pressure controller (including device), for one with an automatic transmission, for the purpose of reducing shock during a gear shift. More particularly, the present invention relates to the hydraulic pressure controller (including device) and the use thereof to control line pressure during the shift mode of the automatic transmission according to the vehicle speed and throttle opening degree.

2. Background

Tokko No. Sho 61-48021 and Tokko No. Hei 7-92140 disclose hydraulic pressure control devices for an automatic transmission. Tokko No. Sho 61-48021 discloses a hydraulic pressure controller (including device) for an automatic transmission comprising: a friction element operative to a line pressure that chooses a power train path of a transmission mechanism connected to an engine output shaft; a line pressure control valve controlling the line pressure applied to the friction element; a shift solenoid applying the line pressure to or removing the same from the friction element; a control means for controlling a line pressure adjusting valve and a shift solenoid by comparing a current gear and a predetermined gear located in a shift map with signals from an engine load sensor and a vehicle speed sensor.

The oil (or hydraulic) pressure controller controls the line pressure at a different pressure during a shift mode of changing friction elements from as opposed to a non-shift mode and regulates the line pressure at a lower pressure to match up to an engine load read or measured by an engine load sensor, which attenuates or reduces a shift shock.

Tokko No. Hei 7-92140 discloses a hydraulic pressure controller for an automatic transmission, which controls a line pressure applied to a friction element of the automatic transmission according to information of an engine load detected or measured by an engine load detecting means, and a vehicle speed detected or measured by a vehicle speed detecting means so as to attenuate or reduce a shift shock when a selector lever is manually shifted.

Further, in an automatic transmission with a one-way clutch, the one-way clutch synchronizes with a gear shift to attenuate a shift shock during a downshift to the gear operative with the one-way clutch.

However, there is a recent tendency to reduce the number of one-way clutches to make the automatic transmission smaller. For example, there is an automatic transmission that has only one gear operative with the one-way clutch.

During downshift to a gear not operative with the one-way clutch of such automatic transmission, a clutch engagement timing is adjusted to have an engine rotational speed increased to synchronize rotational speeds of engaging members of the clutch in order to attenuate the shift shock.

A line pressure is generally changed or adjusted during a gear shift as a means for adjusting the clutch engagement timing of the downshift. Thus, if the line pressure is lowered during the gear shift, the clutch engagement timing is delayed and the engine rotational speed is increased a great amount to synchronize the engaging members where a high engine rotational speed is required. If the line pressure is raised during the gear shift, the clutch engagement timing is advanced and the engine rotational speed is increased a small amount to synchronize the engaging members in the case that the high engine rotational speed is not required.

However, in such method of changing the line pressure during the gear shift, if the line pressure is lower than the correct pressure, the engine rotational speed exceeds the synchronized rotational speed and causes racing. If the line pressure is higher than the correct pressure, a shift shock in a direction to pull a vehicle, so-called a pullback shock, is caused since the clutch engagement is started before the engine rotational speed reaches the synchronized rotational speed.

Since the engine rotational speed for synchronization during the gear shift is corresponding to the vehicle speed, it is possible to set the line pressure according to the vehicle speed in order to control the line pressure at the correct pressure during the gear shift. For example, the clutch engagement timing is delayed during the downshift at a higher vehicle speed because it requires more synchronizing time to raise the engine rotational speed a great amount. The clutch engagement timing is advanced during the downshift at a lower vehicle speed because it requires less synchronizing time to raise the engine rotational speed a small amount.

However, in the above method of changing the line pressure during the gear shift, the correct engagement timing is not necessarily established by setting single line pressure at a vehicle speed and the shift shock is caused by the correct line pressure at the same vehicle speed in the event of "kick-down" (shift-down made by the automatic transmission in response to a driver's intentional depression of the accelerator pedal) as opposed to the situation where the accelerator pedal is released from the driver's foot differs from that in the event of kick-down from the situation that the accelerator pedal is depressed to a certain degree.

When the accelerator pedal is released, as opposed to when the accelerator pedal is depressed, it takes longer for the engine torque to increase to a certain level and for the engine rotational speed to reach the synchronized rotational speed, which causes a time lag. The shift shock is particularly evident with an automatic transmission connected to a turbo-charged engine.

In order to avoid the shock, it is possible to set a delay time after the gear shift is determined and before the gear shift signal is transmitted to a shift solenoid, in the event of kick-down when the accelerator pedal is released, so that the actual gear shift is started after the delay time since the gear shift determination and the gears are shifted after the engine torque is increased to a certain level. The delay time enables the correct line pressure for kick-down when the accelerator pedal is released and is almost the same as that for kick-down when the accelerator pedal is depressed to a certain degree.

However, in this method of setting the delay time, because the driver wants immediate acceleration by the kick-down, it is against the driver's intention to set the delay time such that an immediate response is not realized.

If the delay time is too short, the gear shift is started when the engine torque is not large enough, such that the single line pressure cannot handle the synchronization, and causes the shift shock.

SUMMARY OF THE INVENTION

The preferred embodiment of the present invention includes hydraulic pressure controller (including device) for an automatic transmission, and an oil (or hydraulic) control method thereof, which provides a smooth kick-down from any accelerator pedal position in order to attenuate shift shock.

The oil (or hydraulic) controller of the preferred embodiment comprises a throttle opening degree sensor, a vehicle speed sensor to detect a vehicle speed, a hydraulic pressure controller (or means) to which an output signal from each sensor is input, and a line pressure solenoid to which an output signal from the hydraulic controller (or means) is input. The hydraulic pressure controller further comprises a storage means (including device) for storing the output signal from the throttle opening degree sensor and a line pressure control means (including device) for controlling the line pressure during a gear shift according to the throttle opening degree during a predetermined period of time before the gear shift is determined.

The hydraulic pressure controller of the preferred embodiment, therefore, stores information regarding the throttle opening degree for the predetermined period of time before the gear shift is determined and controls the line pressure during the gear shift according to the throttle opening degree so that a smooth clutch engagement can be established and that the shift shock is attenuated for any throttle opening degree just before the gear shift determination.

BRIEF DESCRIPTION OF THE DRAWINGS

FIG. 5(A) is a time chart in the event of kick-down from situations with the throttle closed and open. FIG. 5(B) is a line pressure table used in the event of kick-down shown in FIG. 5(A).

DETAILED DESCRIPTION OF THE PREFERRED EMBODIMENT

Referring now in more detail to the drawing, in which like numerals refer to like elements throughout the several views, a preferred embodiment of the present invention is illustrated in FIGS. 1 through 6.

Figure 1:
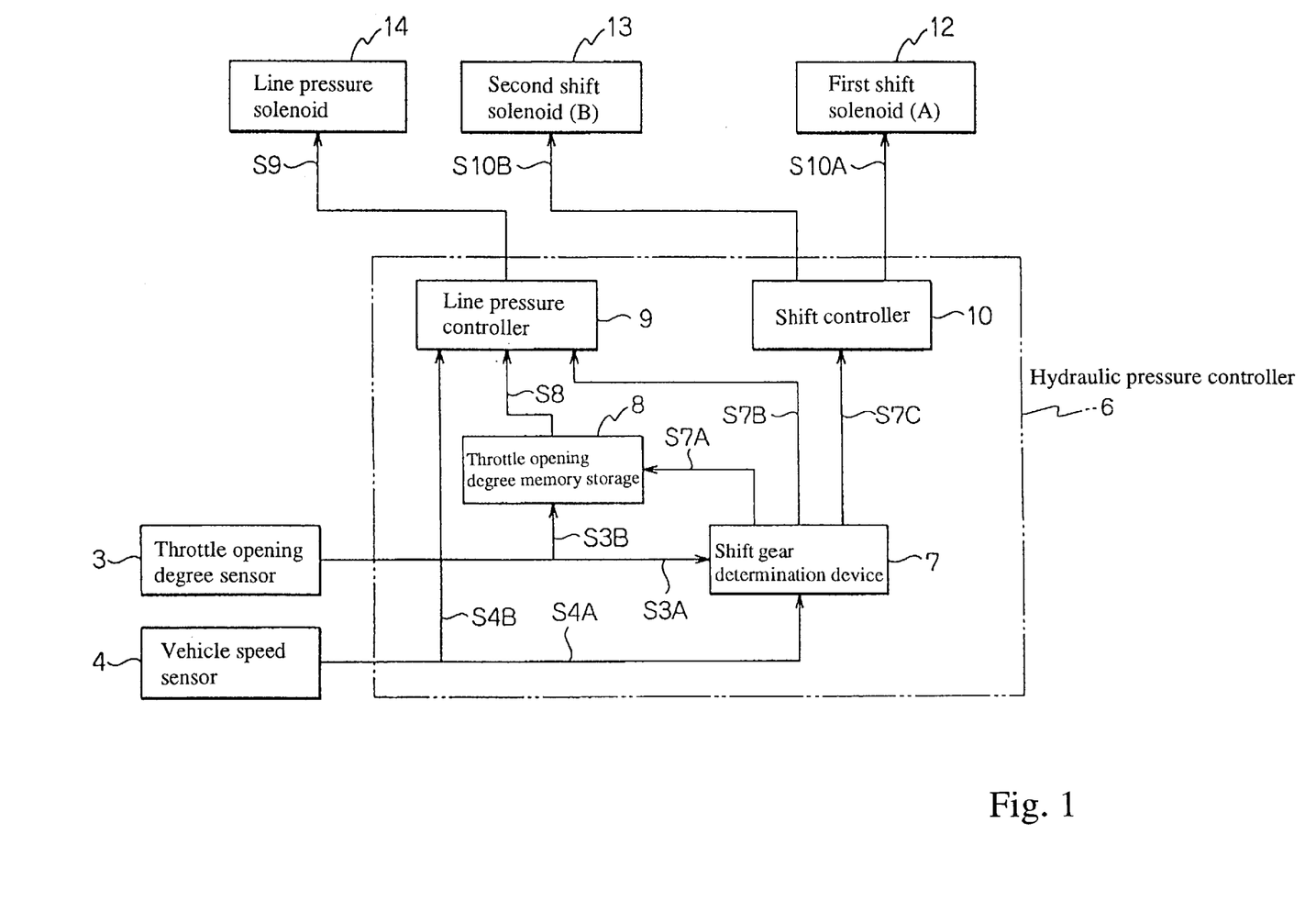
FIG. 1 is a block diagram of an embodiment of the present invention.

FIG. 1 shows a block diagram of the present embodiment, which comprises a throttle opening degree sensor 3, a vehicle speed sensor 4, an oil (or hydraulic) pressure controller (or means) 6, a line pressure solenoid 14, a first shift solenoid (A) 12 and a second shift solenoid (B) 13. The hydraulic pressure controller 6 further comprises a shift gear determination device (or means) 7, a throttle opening degree memory means (including storage and device) 8 for a throttle opening degree, a line pressure controller (or means) 9 and a shift controller (or means) 10.

The throttle opening degree sensor 3 transmits a signal representing the throttle opening degree information to the shift gear determination device 7 via S3A and to the memory storage 8 via S3B. The vehicle speed sensor 4 transmits a signal representing vehicle speed information to the shift gear determination device 7 via S4A and to the line pressure controller 9 via S4B. The gear determination device 7 transmits signals to the memory storage 8 via S7A, to the line pressure controller 9 by S7B and to the shift controller 10 via S7C. The line pressure controller 9 transmits a signal to the line pressure solenoid 14 via S9. The shift controller 10 transmits signals to the first shift solenoid (A) 12 via S10A and the second shift solenoid (B) 13 via S10B.

Figure 2:
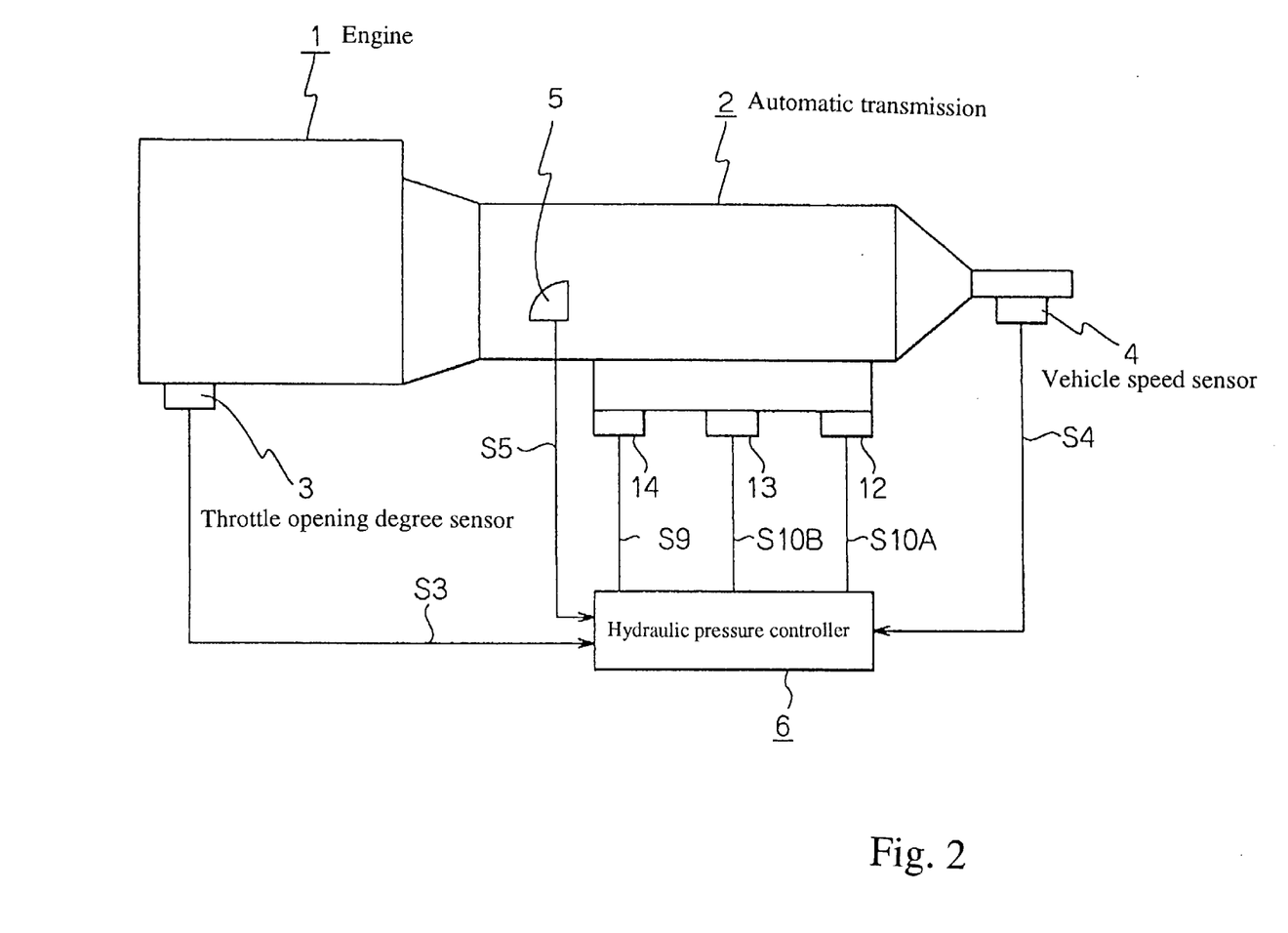
FIG. 2 is a system drawing showing the relationship between an engine, an automatic transmission and the hydraulic pressure controller for the automatic transmission shown in FIG. 1.

FIG. 2 illustrates a front engine rear-wheel drive power train in association with the present invention. It will be understood that the present invention is not limited to the power train illustrated, but is equally suitable to FF (front engine front-drive), MR (mid engine), 2WD and 4WD (four-wheel drive) type arrangements to name just a few combination. The power train comprises an engine 1 and an automatic transmission 2. As shown in FIG. 2, the throttle opening degree sensor 3 is operatively connected to the engine 1, and a shift position sensor 5 is operatively positioned inside of the automatic transmission 2. The line pressure solenoid 14, the first shift solenoid (A) 12 and the second shift solenoid (B) 13 are likewise operatively connected the automatic transmission 2. The vehicle speed sensor 4 is attached to an output shaft, or the like, of the automatic transmission 2. Each sensor 3, 4, 5 transmits a signal to the hydraulic pressure controller 6. The hydraulic pressure controller 6 transmits signals to the line pressure solenoid 14, the first shift solenoid (A) 12 and the second shift solenoid (B) 13. The hydraulic pressure controller 6 selects a power train path of the automatic transmission 2 connected to an output shaft of the engine 1 with friction elements operative with a line pressure.

Figure 3:
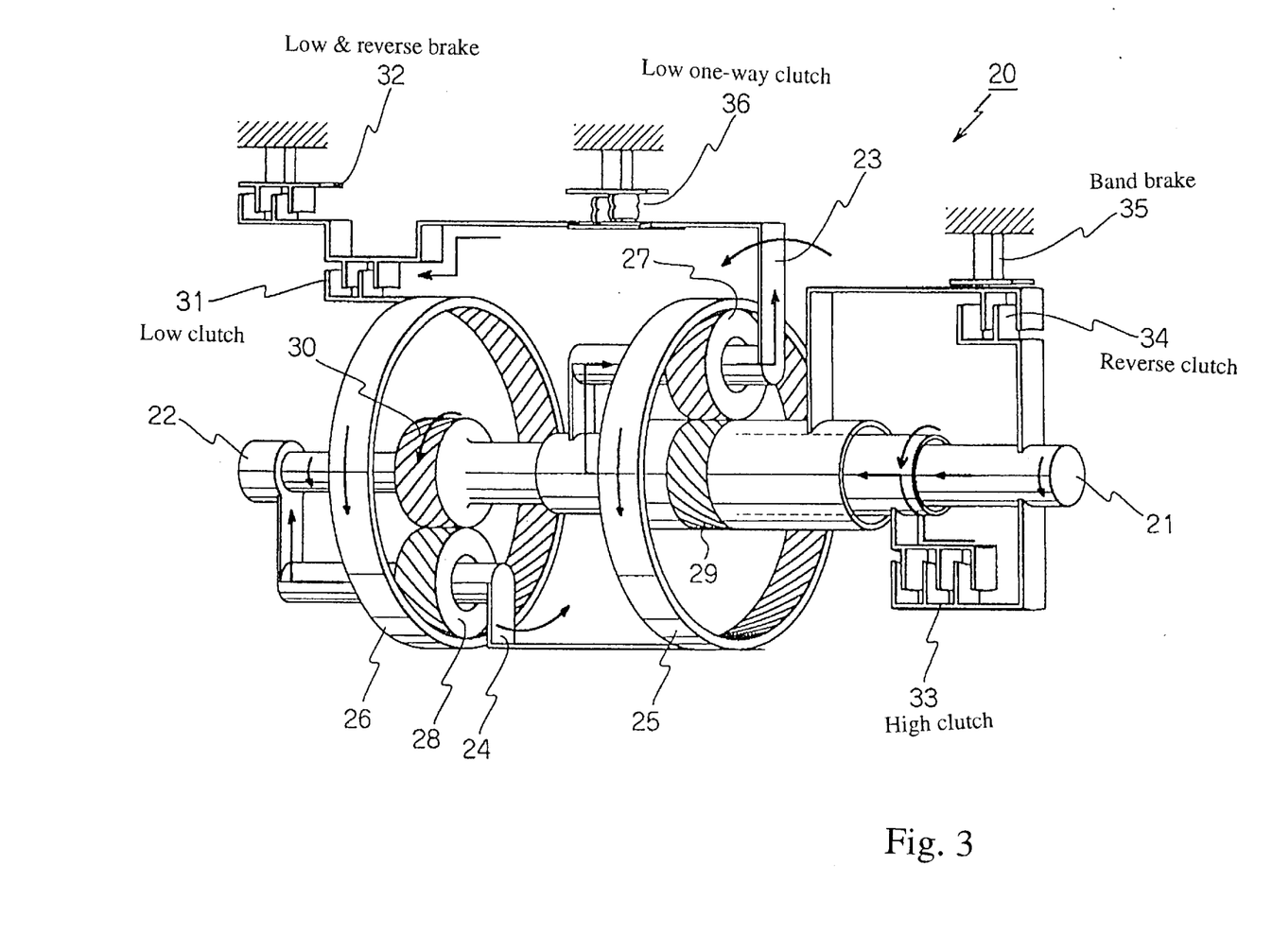
FIG. 3 is a partial interior perspective view of the automatic transmission shown in FIG. 2.

The automatic transmission 2, as shown in FIG. 3, includes a planetary gear mechanism 20 to which torque is transmitted from a torque converter (not shown) and comprises a pair of planetary gear systems and six (6) friction elements.

The pair of planetary gear systems are disposed to operate between an input shaft 21 to which torque is transmitted from the torque converter and an output shaft 22 from which reduced torque is transmitted to a propeller shaft (not shown). The pair of planetary gear systems comprise a front carrier 23, a rear carrier 24, a front internal gear 25, a rear internal gear 26, a front pinion 27, a rear pinion 28, a front sun gear 29 and a rear sun gear 30 (see FIG. 3).

The friction elements include: a wet multiple-disc type of low clutch 31 for engaging or disengaging the rear internal gear 26 and the front carrier 23; a wet multiple-disc type of low & reverse brake 32 locking the front carrier 23; a wet multiple-disc type of high clutch 33 for engaging and disengaging the input shaft 21 and the front carrier 23; a wet multiple-disc type of reverse clutch 34 for engaging or disengaging the input shaft 21 and the front sun gear 29; a band type of band brake 35 locking the front sun gear 29; and, a sprag type of low one-way clutch 36.

By way of example, when the hydraulic pressure controller 6 shown in FIG. 2 transmits a signal requiring the third gear, the high clutch 33 and the low clutch 31 are engaged and then the torque input from the input shaft 21 is transmitted to the rear internal gear 26 through the high clutch 33. The torque transmitted to the rear internal gear 26 is further transmitted to the rear sun gear 30 through the rear pinion 28 and thus, the rear internal gear 26 and the rear sun gear 30 rotate at the same rotational speed. And the rear carrier 24 supported by the rear pinion 28 rotates so that torque at the same rotational speed is output from the output shaft 22 at the same rotational speed.

Figure 4:
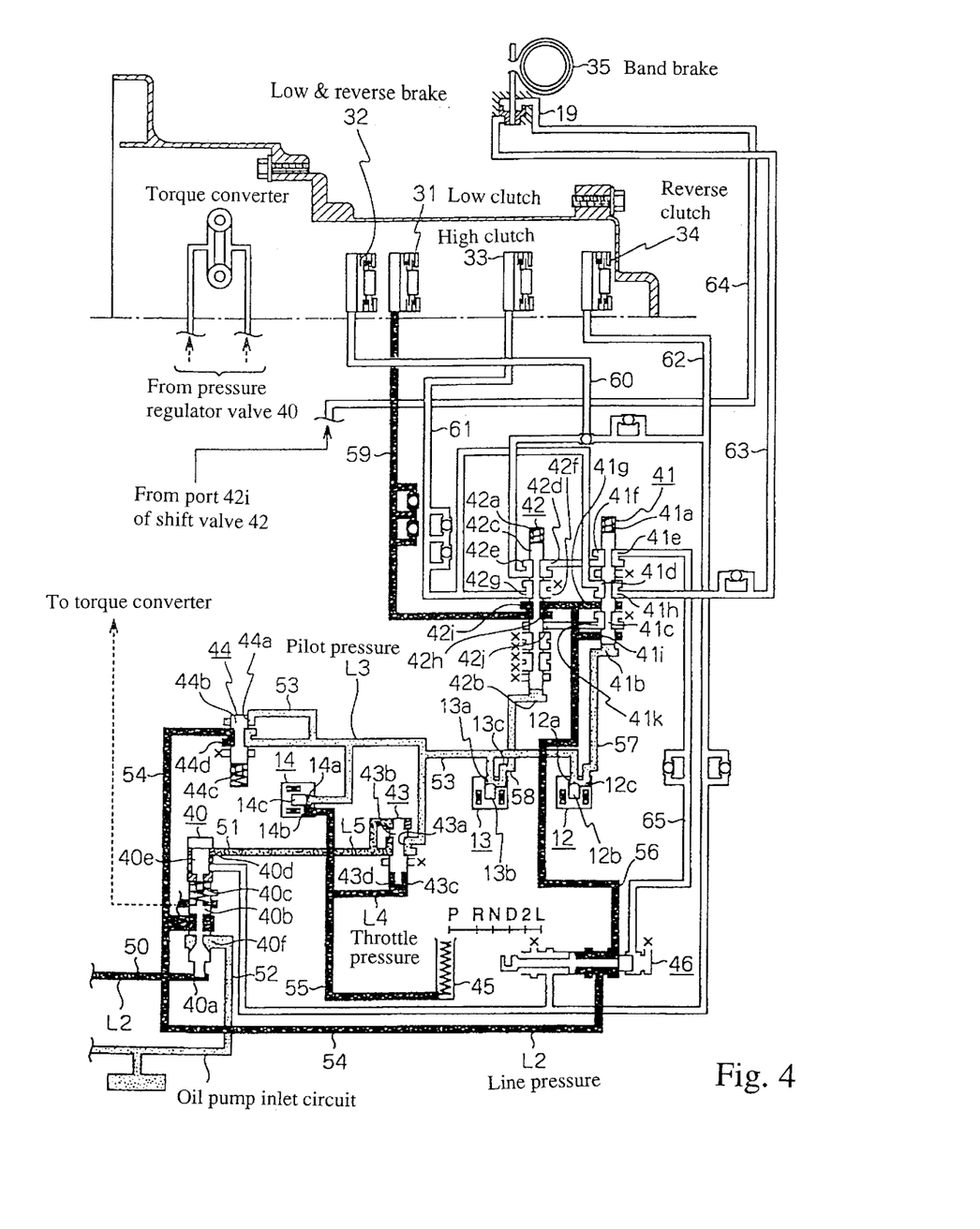
FIG. 4 is an oil (or hydraulic) pressure circuit of the automatic transmission shown in FIG. 2.

Now referring to FIG. 4, an oil (or hydraulic) pressure circuit is illustrated which controls the above-mentioned friction elements. In FIG. 4, the same symbol designates the same line pressure.

As shown in FIG. 4, a manual valve 46 is operated by a gear selector lever by which an operator selects a parking position P for parking the car; a reverse position R for going back; a neutral position N for releasing friction elements; a drive position D for going forward; a second position 2, or a first position 1. The operation will now be explained with regard to the drive position D.

When the drive position D is selected, a running gear is selected among those available by the hydraulic pressure controller 6, depending on input from the sensors 3, 4.

The first gear is selected when the line pressure L2 acts on the low clutch . Further, the low one-way clutch 36 shown in FIG. 3, is engaged when the vehicle is accelerated in the first gear.

Returning to FIG. 4, the second gear is selected when the line pressure L2 acts on the low clutch 31 and the band brake 35 of the above-mentioned friction elements.

The third gear is established when the line pressure L2 acts on the low clutch 31 and the high clutch 33.

The fourth gear is selected when the line pressure L2 acts on the high clutch 33 and the band brake 35.

The hydraulic pressure circuit operating the friction elements comprises mainly: a pressure regulator valve 40 which adjusts a discharge pressure from a pump to a best line pressure L2; a first and a second shift valves 41, 42 that distribute the best line pressure L2, controlled by the pressure regulator valve 40, to one of three ways in order to control the above-mentioned friction elements 31, 32, 33, 34, 35; the first and the second shift solenoids 12, 13 that operate the first and second shift valves 41, 42 respectively with a pilot pressure L3 according to the factors such as the vehicle speed and the throttle opening degree; and conduits 51, 52, 53, 54, 55, 56, 57, 58, 59, 60, 61, 62, 63, 64, 65 that connects each valve.

The pressure regulator valve 40 is controlled by the line pressure solenoid 14 via a pressure-modifier valve 43. That is to say, the pressure regulator valve 40 is controlled by a pressure-modifier pressure L5 distributed from the pressure-modifier valve 43, and the pressure15 modifier valve 43 is controlled by a throttle pressure L4 switched by the line pressure solenoid 14.

The first and the second shift valves 41, 42 are controlled by the pilot pressure L3 adjusted to the correct pressure by a pilot valve 44 and switched by the first and the second shift solenoids 12, 13.

The operation of each valve is now described in detail.

An oil (or hydraulic) pump pressurizes the conduit 50, connected to a port 40a, which acts on the pressure regulator valve 40 (shown in the left bottom of the figure), controlled by the line pressure solenoid 14, such that the valve body 40b may be pushed up by the oil pump discharge (or outlet) pressure. Opposing the pressured conduit 50, a spring force exerted by a spring 40c and the pressure-modifier pressure L5 passing through a pressure regulator plug 40e and the conduit 51 connected to a port 40d act on the pressure regulator valve 40 such that the valve body 40b may be pushed down. As known to those in the art, the valve body up-and-down movement operates to open and/or close the valve.

Thus, if the oil pump discharge pressure becomes greater than the combination of the spring force of the spring 40c and the pressure5 modifier pressure L5, the valve body 40b is pushed up and the fluid within the conduit 50 is drained through the conduit 52 connected to a port 40f. And the line pressure L2 is regulated by the pressure-modifier pressure L5.

The pilot pressure L3 passing through the conduit 53, connected to a port 44a, acts on the pilot valve 44, installed parallel to the pressure regulator valve 40, such that the valve body 44b may be pushed down.

On the other hand, the spring force exerted by the spring 44c acts on the pilot valve 44 such that the valve body 44b may be pushed up. The line pressure L2 passing through the conduit 54, connected to a port 44d, acts on the pilot valve 44 such that the valve body 44b may be pushed down. If the line pressure L2 is great enough, the valve body 44b is pushed down so that the fluid is drained from an associate drain port X. Therefore, the pilot pressure L3 is adjusted by balancing the line pressure L2 with the spring force exerted by the spring 44c.

The pilot pressure L3 passing through the conduit 53, acts on a port 14a of the line pressure solenoid 14, which in turn controls the pressure-modifier valve 43, as shown in FIG. 4. The throttle pressure L4, passing through the conduit 55 connected to a port 14b, is regulated by duty-controlling a solenoid 14c with vehicle information such as accelerator pedal depression degree.

The conduit 55 is connected to a throttle accumulator 45, which diminishes the fluctuations in the throttle pressure L4.

A force exerted by a spring 43c and the throttle pressure L4, passing through the conduit 55 connected to a port 43d, act on the pressure-modifier valve 43 such that a valve body 43b may be pushed up. The pilot pressure L3, passing through the conduit 53 connected to a port 43a, acts on the valve 43 such that the valve body 43b may be pushed down. If the throttle pressure L4 is great enough, the valve body 43b is pushed up so that the fluid is drained from an associate port X. Thus, the pressure-modifier L5, passing through the port 43a with the pilot pressure L3, is adjusted by balancing against the combined force exerted by the spring 43c and the throttle pressure L4 output by the line pressure solenoid 14.

A force exerted by a spring 41a acts on the shift valve 41 to push down the valve. The pilot pressure L3 output by the first shift solenoid 12, through the conduit 57 connected to a port 41b, acts on the valve to push it up.

When the first shift solenoid 12 is ON, the pilot pressure L3 generated in the conduit 57 acts on a valve body 41c to push up the valve body 41c. When the first shift solenoid 12 is OFF, the pilot pressure L3 is not generated and the valve body 41c is pushed down by the force of the spring 41c.

In the same manner as the valve body 41c is moved up and down, a fluid path for the line pressure L2 is selected.

The first shift valve 41 and the second shift valve 42 work together to select a fluid path of for line pressure L2 to engage one or more of the friction elements 31, 32, 33, 34 and 35.

A force of a spring 42a acts on the second shift valve 42 to push down the valve. The pilot pressure L3 output by the second shift solenoid 13, through the conduit 58 connected to a port 42b, acts on the valve to push it up.

When the second solenoid 13 in ON, the pilot pressure L3 generated in the conduit 58 acts on the valve body 42C to push up the valve body 42c. When the second shift solenoid 13 is OFF, the valve is pushed down by the force exerted by the spring 42a, since the pilot pressure L3 is not generated.

Thus, a fluid path for the line pressure L2 is selected as the valve body 42c is pushed up and down.

The second shift valve 42 and the first shift valve 41 mentioned before work together to select a fluid path for the line pressure L2 to engage one or more of the friction elements 31, 32, 33, 34, 35.

It will be understood that the manual valve 46, connected between the conduits 54 and 56 as well as the first and the second shift solenoids 12, 13, may switch the first and the second shift valves 41, 42.

When the reverse position R is selected by the manual valve 46, the line pressure L2 passes through the conduit 62 to engage the reverse clutch 34 and through the conduit 60 to engage the low & reverse brake 32.

The first and the second solenoids 12, 13 are disposed between the pilot valve 44 and the first and the second shift valve 41, 42.

The pilot pressure L3 passes through the conduit 53 connected to ports 12a, 13a, and may be introduced into the conduits 57, 58 connected to ports 12c, 13c by energizing or turning ON solenoids 12b, 13b or by de-energizing or turning OFF the solenoids 12b, 13b according to the information from the hydraulic pressure controller as described below.

When the first shift solenoid 12 is ON and the second shift solenoid is ON, the first gear is selected. The low clutch 31 of the friction elements is operated when the first gear is engaged.

When the first shift solenoid 12 is ON, the pilot pressure L3 generated in the conduit 57 acts on the valve body 41c of the first shift valve 41 to push up the valve body 41c.

When the second shift solenoid 13 is ON, the pilot pressure L3 generated in the conduit 58 acts on the valve body 42c of the second shift valve 42 to push up the valve body 42c.

So, the line pressure L2 passing through the conduit 56, connected to a port 42h, transfers to the conduit 59, connected to a port 42i, to operates the low clutch 31.

When an L range is selected, the manual valve 46 is moved to the right as viewed in the FIG. 4, causing the line pressure L2 to be introduced to the conduit 65, a port 42d via ports 41e, 41f and then the conduit 60, connected to a port 42e, to operate the low & reverse brake 32.

Next, when the first shift solenoid 12 is OFF and the second shift solenoid is ON, the second gear is selected. When the second gear is engaged, the low clutch 31 and the band brake 35 are operated.

Since pilot pressure L3 is not generated with the first shift solenoid 12 OFF, the valve body 41c of the first shift valve 41 is pushed down by the force exerted by the spring 41a.

If the second shift solenoid 13 is ON, the pilot pressure L3 generated in the conduit 58 acts on the valve body 42c of the second shift solenoid valve 42 to push up the valve body 42c.

The line pressure L2 introduced from the conduit 56 connected to the port 42h transfers to the conduit 59, connected to the port 42i, to operate the low clutch 31.

Further, the line pressure L2 is introduced into the conduit 63, connected to a port 41h, and acts on the applying side to operate the band brake 35.

When the first shift solenoid 12 is OFF and the second shift solenoid 13 is OFF, the third gear is selected. When the third gear is engaged, the low clutch 31 and the high clutch 33 are operated. Since the pilot pressure L3 is not generated with the first shift solenoid 12 OFF, the valve body 41c of the first shift valve 41 is pushed down by the force exerted by the spring 41a.

Since the pilot pressure L3 is not generated with the second shift solenoid 13 OFF, the valve body 42c of the second shift valve 42 is pushed down by the force exerted by the spring 42a.

The line pressure L2 passing through conduit 56, connected to the port 42i, further passes via ports 41k, 42j the conduits 59, 64 connected to the port 42i to operate the low clutch 31 and act on the release side of the band brake 35.

The line pressure L2, introduced from the conduit 56 connected to the port 42i, passes through the conduit 63 connected to the port 41h to act on the applying side of the band brake 35. However, the band brake 35 is operatively released because the areas the pressures act on are different.

The line pressure L2 introduced from the conduit 56 connected to a port 42f, passes through the conduit 61, connected to a port 42g, to operate the high clutch 33.

When the first shift solenoid 12 is ON and the second shift solenoid 13 is OFF, the fourth gear is selected. When the fourth gear is engaged, the high clutch 33 and the band brake 35 are operated. Since the first shift solenoid 12 is ON, the pilot pressure L3 generated in the conduit 57 acts on the valve body 41c of the first shift valve 41 to push up the valve body 41c.

Since the pilot pressure L3 is not generated in the conduit 58 with the second shift solenoid 13 OFF, the valve body 42c of the second shift valve 42 is pushed down by the spring force of the spring 42a.

The line pressure L2, introduced from the conduit 56 connected to the port 42f, passes through the conduit 61, connected to the port 42g, to operate the high clutch 33.

The line pressure L2 introduced from the conduit 61 connected to a port 41d, passes through the conduit 63 connected to the port 41h, and acts on the applying side of the band brake to operate the band brake 35.

Now, the hydraulic pressure controller 6 for the automatic transmission 2 is described in detail. As shown in FIG. 2, the hydraulic pressure controller 6 for the automatic transmission comprises: the throttle opening degree sensor 3 to detect the throttle opening degree; the vehicle speed sensor 4 to detect the vehicle speed; the hydraulic pressure controller 6 to which both sensors 3,4 are connected with signal wires; the first and the second shift solenoids 12, 13 connected with signal wires from the output terminal of the hydraulic pressure controller 6 and operating the friction elements 31, 32, 33, 34, 35, 36 of the automatic transmission connected to the output shaft of the engine 1, illustrated in FIG. 3; and the line pressure solenoid 14 that determines the line pressure L2 of the friction elements, illustrated in FIG. 4.

Returning to FIG. 2, the throttle opening degree sensor 3 is positioned with a throttle portion of the engine 1. A potentiometer type of throttle opening degree sensor that outputs a voltage signal corresponding to the throttle opening degree may be used. The signal S3 output from the throttle opening degree sensor 3 enters an input terminal of the hydraulic pressure controller 6.

The vehicle speed sensor 4 is positioned with an output shaft portion of the automatic transmission 2. A lead switch, which transmits ON-and-OFF signals repeatedly by a magnet rotating with the output shaft, may be used for the sensor. A signal S4 output from the vehicle speed sensor 4 enters an input terminal of the hydraulic pressure controller 6.

A shift position sensor 5 (FIG. 2) detects the gear position selected by the shift knob, which is connected with the manual valve 46, as shown in FIG. 4, and outputs a signal of the gear position selected to the input terminal of the hydraulic pressure controller 6.

The first and the second shift solenoids 12, 13 are positioned in the oil (or hydraulic) pressure circuit that operates the friction elements of the automatic transmission, which are in turn connected to the output shaft of the engine 1. More particularly, they are disposed between the pilot valve 44 and the first and the second shift valves 41, 42. Each shift solenoid 12, 13 is turned ON or OFF to control the first and the second shift valves 41, 42 to determine or establish the gear, i.e. the first, second, third, or fourth gear.

Returning to FIG. 2, the first and the second shift solenoids 12, 13 have operating lines connected to output terminals of the hydraulic pressure controller 6, and are turned ON or OFF by signals S10A, A10B transmitted from the hydraulic pressure controller 6. "ON" means energizing an exciting coil of the first or the second shift solenoid 12, 13 and "OFF" means no energizing the exciting coil of the first or the second shift solenoid 12, 13.

The line pressure solenoid 14 controls the line pressure L2 according to a signal S9 from the hydraulic pressure controller 6.

As shown in FIG. 4, the line pressure solenoid 14, on which the pilot pressure L3 acts, controls the throttle pressure L4 in the conduit 55, connected to the port 14b, according to the signal S9 from the hydraulic pressure controller 6. The pressure-modifier pressure L5 is adjusted with the pressure-modifier valve 43 by balancing with the throttle pressure L4.

The line pressure L2 is controlled by the pressure regulator valve 40 corresponding to the pressure-modifier pressure L5.

As shown in FIG. 2, the signal wire of the line solenoid 14 is connected with an output terminal of the hydraulic pressure controller 6.

The hydraulic pressure controller 6, as shown in FIG. 1, comprises a shift gear determination device 7 that receives the signal S3A from the throttle opening degree sensor 3 and the signal (information) S4A from the vehicle speed sensor 4. The throttle opening degree memory storage 8 receives a signal (information) S7A from the shift gear determination device 7, and a signal (information) S3B from the throttle opening sensor 3. The line pressure controller 9 receives a signal (information) S8 from the throttle opening degree memory storage 8, a signal (information) S7B from the shift gear determination device 7 and a signal (information) S4B from the vehicle speed sensor 4. The shift controller 10 receives a signal S7C from the gear determination device 7.

An on board computer (not shown), as well known to those skilled in the art, comprising: a central processing unit (CPU) that processes information; memory media to store the information (e.g, ROM and RAM); an input section (including terminal) for signals such as the signal S4 from the vehicle speed sensor 4; and an output section (including so-called driver) that outputs signals to each shift solenoid 12, 13 and so on may be employed for the hydraulic pressure controller 6. The ROM in the media, for example, stores shift gears corresponding to an engine load (including throttle opening degree) and the vehicle speed, that is, a shift map.

The throttle opening degree signal S3A, from the throttle opening degree sensor 3, and the vehicle speed signal S4A, from the vehicle speed sensor 4, enter the input section of the shift gear determination device 7.

The shift gear determination device 7 is equipped with the shift map and selects the gear by locating the throttle opening degree and the vehicle speed information in the shift map. If the selected gear differs from the current gear, the shift gear determination device 7 outputs shift gear determination signals S7B, S7C to the line pressure controller 9 and the shift controller 10, respectively.

The shift determination signal S7C from the shift gear determination device 7 enters the input section of the shift controller 10. The first and second shift solenoids 12, 13 are connected with the output section of the shift controller 10.

The shift controller 10 outputs shift control signals S10A, S10B of "ON" or "OFF" to the first and the second shift solenoids 12, 13.

The throttle opening degree signal S3B from the throttle opening degree sensor 3 enters the input section of the throttle opening degree memory storage 8. The throttle opening degree memory storage 8 receives and stores the throttle opening degree information S3B. Then, the throttle opening degree memory storage 8 outputs the throttle opening degree signal (information) S8 to the line pressure controller 9.

The line pressure controller 9 receives the vehicle speed signal S4B from the vehicle speed sensor 4; the throttle opening degree signal S8 from the throttle opening memory storage 8, and the shift determination signal S7B from the shift gear determination device 7.

The line pressure controller 9 controls the line pressure solenoid 14 according to a line pressure calculated from these signals.

The information regarding shifting (i.e. in the shift or the non-shift mode), and the gear to be shifted according to the shift determination signal S7B from the shift gear determination device 7, are input to the line pressure controller 9. Then, the line pressure is controlled with different line pressure tables in the shift and the non-shift modes.

In the shift mode, the line pressure is controlled with a line pressure table set for every kind of shifting. In the non-shift mode, the line pressure is controlled with a line pressure table set for every shift gear.

In downshifts (i.e., shifting gears from a high gear to low gear), more particularly in kick-down (i.e., downshifts caused by the driver's intentional depression of the accelerator pedal), the line pressure is controlled during shifting according to at least the throttle opening degree signal (information) S8 for the predetermined period just before the shift gear determination time and the vehicle speed signal (information) S4B. The line pressure is regulated lower when the throttle opening degree is low than when it is high.

The line pressure controller 9 has a threshold memory means (including storage) for storing a threshold. The line pressure controller 9 determines if the throttle opening degree is low or high depending on whether the throttle opening degree signal S8 from the throttle opening degree memory storage 8 is less than the threshold or not. The line pressure is varied according to the determination.

Figure 5:
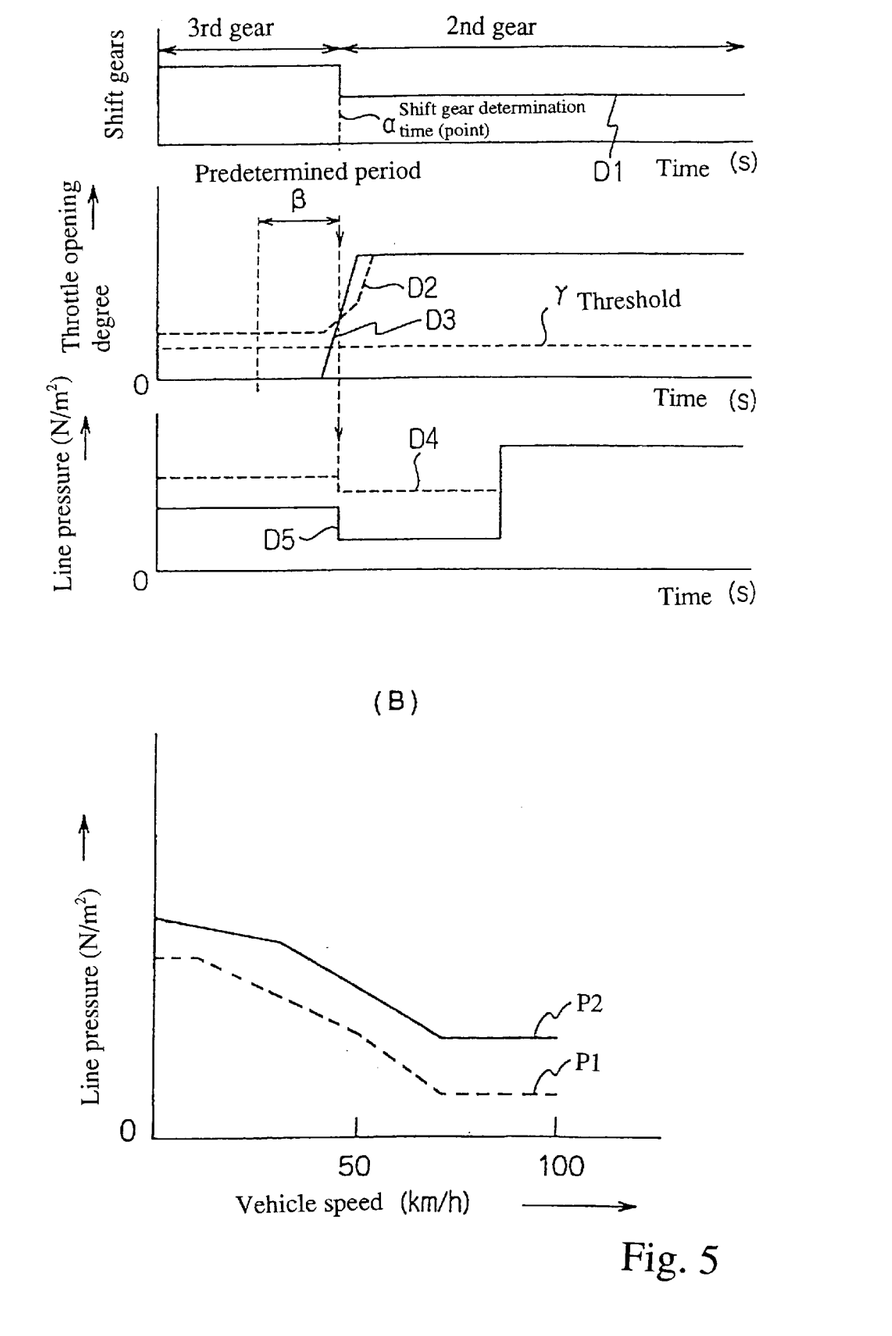
FIG. 5 includes a time chart of the hydraulic pressure controller for the automatic transmission and a line pressure table.

FIG. 5 illustrates how to calculate the line pressure during kick-down. FIG. 5(A) is a time chart which begins when the kick-down is made. The lines in the upper chart show the shift gears. The lines in the middle chart illustrate the accelerator (or throttle) opening degrees. The lines in the bottom chart show the controlled line pressures.

In the lines of the FIG. 5(A), the x-axis of every upper, middle and bottom chart is on the same time base (s) but the vertical axis of the upper chart shows the shift gears, the vertical axis of the middle chart shows the throttle opening degrees, and the vertical axis of the bottom chart shows the line pressures ($N/m^2$).

In the middle chart, the line D2 indicates the throttle opening degrees when the kick-down is made between when the accelerator pedal is depressed to some extent and when the car runs with the third gear. The line D3, on the other hand, indicates the throttle opening when the kick-down is between when the accelerator pedal is not depressed or is released when the car runs with the third gear.

When the throttle opening degree becomes greater than the predetermine opening degree along the line D2 or D3, the shift gear determination device 7 initiates a gear shift from third gear to second gear. The time when the shift gear determination device 7 initiates the gearshift is now termed the shift gear determination time $\alpha$.

The point before the predetermined period $\beta$ from the shift gear determination time cc is termed the throttle opening degree determination point. The predetermined period $\beta$ is the period of time for which the throttle opening degree and other states before the kick-down may be recognized.

The throttle opening degree, before the predetermined period $\beta$ from the shift gear determination time $\alpha$, is stored or memorized by the throttle opening degree memory storage 8.

The line pressure controller 9 determines if the throttle opening degree is greater than the predetermined degree (i.e., the accelerator pedal is depressed to some extent) or the throttle is completely closed (i.e., the accelerator pedal is released from the driver's foot) by the throttle opening degree information S8 at the time before the predetermined period $\beta$ from the shift gear determination time $\alpha$.

The determination of the throttle state is made by recognizing whether or not the throttle (or accelerator) opening degree is less than the threshold $\gamma$.

In the case of the line D2, it is determined that the throttle is open since the throttle opening degree before the predetermined period $\beta$ from the shift gear determination time $\alpha$ is greater than the threshold $\gamma$.

On the other hand, in the case of the line D3, it is determined that the throttle is closed since the throttle opening degree before the predetermined period $\beta$ from the shift gear determination time $\alpha$ is less than the threshold $\gamma$.

Now, it will be understood that it is possible to determine how much degree the throttle is open as well as whether it is open or not if a plurality of thresholds are stored by the threshold memory means (including device). The thresholds may be used as dividing values in a full range of the throttle opening degree in order to locate the throttle opening degree, which falls on one of the threshold or between two thresholds. Since the line pressure is controlled according to the throttle opening degree located by the plurality of thresholds, it is possible to make the kick-down with a smaller shift shock.

After it is determined if the throttle is open or closed, a different line pressure is used for each case as shown in the bottom chart. The line D4 indicates the controlled line pressure when it is determined that the throttle is open. The line D5 indicates the controlled line pressure when it is determined that the throttle is closed.

For either case of the line D4 or D5, the line pressure is controlled to a regular line pressure in the non-shift mode, a shift line pressure in the shift mode and a post-shift line pressure after the shift.

In the shift mode, the line pressure is controlled and raised if it is determined that the throttle is open rather than closed. This is because it is necessary to control the friction elements with a higher pressure since it takes a shorter time to synchronize the engine rotational speed from the state that the throttle is open than from the state that the throttle is closed.

On the other hand, if it is determined that the throttle is closed, the line pressure is lowered. This is because it is necessary to control the friction elements with a lower pressure since it takes a longer time to synchronize the engine rotational speed from the state that the throttle is closed than from the state that the throttle is open.

The line pressure in shifting is also determined according to the line pressure table set for the vehicle speed. This is because it is necessary that the line pressure for clutch engagement be adjusted to the vehicle speed since the synchronizing time may vary with the vehicle speed.

FIG. 5(B) illustrates a line pressure table in shifting which is set for the vehicle speed. The line P1 indicates the line pressure if the throttle opening degree before the predetermined period $\beta$ from the shift gear determination point $\alpha$ is less than the predetermined degree. The line P2 indicates the line pressure otherwise.

The line P2 is generally above the line P1. Both lines P1 and P2 are lowered at higher vehicle speeds. This is because it takes longer to synchronize the engine rotational speed at higher vehicle speeds.

The line pressure table is set for every kind of shifting. By way of example and not limitation, FIG. 5(B) illustrates the line pressure table for shifting from the third to the second gear.

Figure 6:
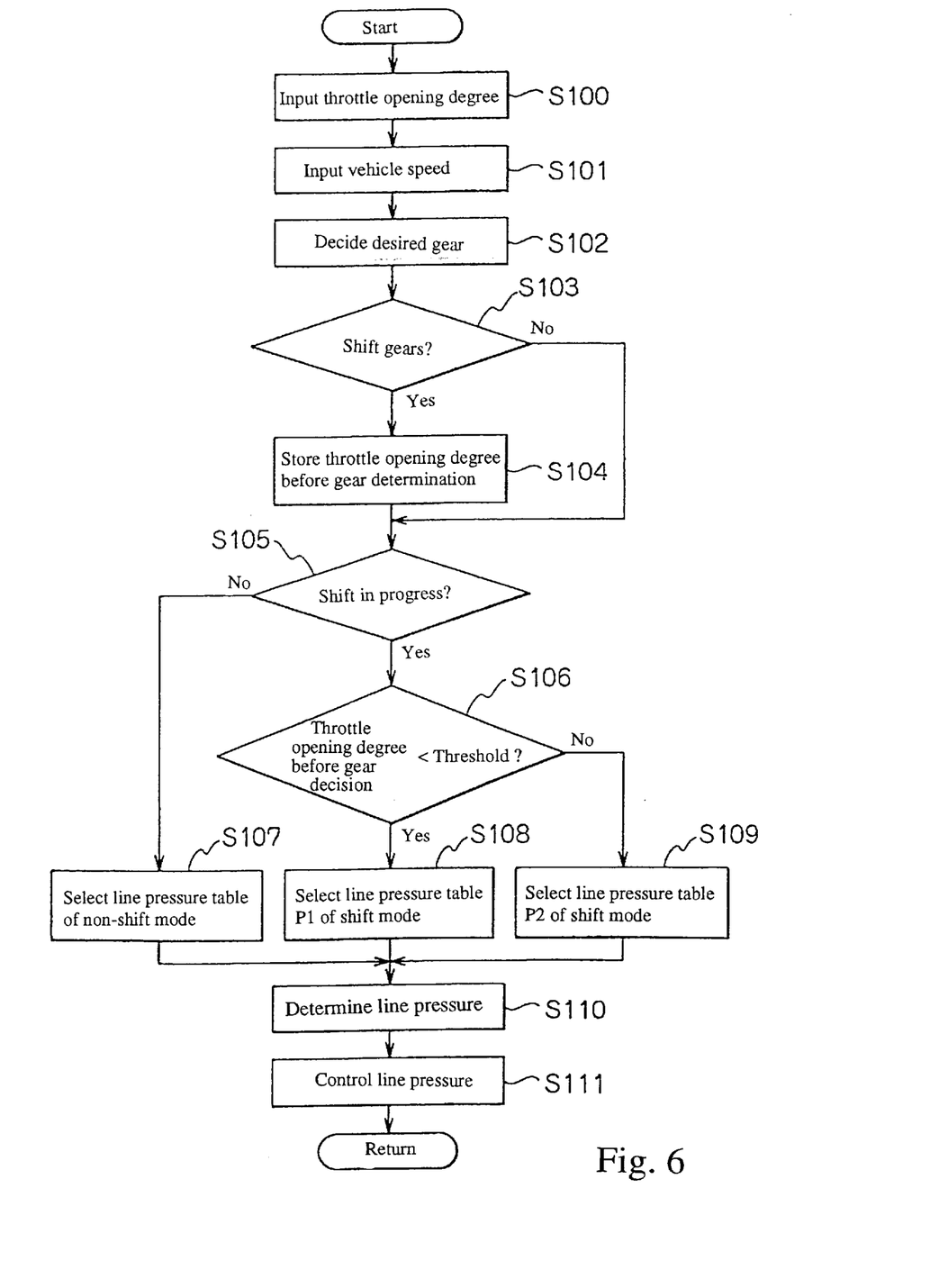
FIG. 6 is a flow chart which illustrates the operation of the hydraulic pressure controller for the automatic transmission shown in FIG. 1.

FIG. 6 illustrates a flow chart of the controller of the automatic transmission in accordance with the present invention.

The process illustrated by the flow chart is started every certain period of cycle time with a timer interrupt handler interrupting the main program periodically in a manner known to those skilled in the art.

First, the throttle opening degree (or the engine load) is read from the throttle opening degree signal S3 of the throttle opening degree sensor 3 (Step S100) and the vehicle speed is read from the vehicle speed signal S4 of the vehicle speed sensor 4 (Step 101).

The shift gear determination device determines the gear by locating the throttle opening degree and the vehicle speed information input from the throttle opening degree sensor 3 and the vehicle speed sensor 4 in the pre-set shift map (Step 102).

It is determined to go to the Step 104 if the determined gear is different from the current gear (in the case of shift mode) or to go to the Step 105 otherwise (Step 103).

In the case of the shift mode, the throttle opening degree before the predetermined period $\beta$ from the shifting point (i.e., the throttle opening degree before the shift gear determination point) is stored by the throttle opening degree memory storage and the program proceeds to Step 105 (Step 104).

Next, it is determined if the current status is in the shift mode. It is deemed to be in the shift mode for the period of time predetermined for every kind of shifting since the shifting point. Then, the program proceeds to Step 106, if it is in the shift mode, or to Step 107 if it is not in the shift mode (the non-shift mode) (Step 105).

If it is in the shift mode, it is determined whether the throttle opening degree before the shifting point is less than the threshold $\gamma$ as illustrated in FIG. 5(A). Returning to FIG. 6, if the throttle opening degree is less than the threshold, the program proceeds to Step 108. If the throttle opening degree is equal or greater than the threshold, the program proceeds to Step 109. (Step 106).

If it is not in the shift mode (Step 107), the regular line pressure table is picked up.

If it is in the shift mode and the opening degree is less than the threshold (Step 108), the line pressure table corresponding to the shift from the state that the throttle is closed is picked up, as illustrated by line Pa in FIG. 5(B), by way of example.

If it is in the shift mode and the opening degree is equal or greater than the threshold (Step 109), the line pressure table corresponding to the shift from the state that the throttle is open is picked up, as illustrated by line P2 in FIG. 5(B), by way of example.

Then, as shown in FIG. 6, the line pressure corresponding to the vehicle speed in the line pressure table is calculated (Step 110).

The line pressure control signal is output to the line pressure control solenoid according to the calculated line pressure (Step 111).

The process mentioned above may enable the downshift without any shift shock in the case of kick-down with the accelerator pedal released from the driver's foot or with the accelerator pedal depressed to a certain extent.

Conclusion

In accordance with the present invention, the hydraulic pressure control system enables smooth clutch engagement despite the throttle opening degree before the shift gear determination point and attenuates the shift shock in the event of kick-down. The smooth clutch engagement and attenuated shift shock is provided by a hydraulic pressure control system comprising: the hydraulic pressure controller to control the automatic transmission according to the vehicle speed and the throttle opening degree information; the throttle opening degree memory storage to store the signal from the throttle opening degree sensor; and, the line pressure controller to control the line pressure in shifting according to the throttle opening degree stored by the throttle opening memory storage before the predetermined period from the shift gear determination point. The system controls the line pressure in shifting at the shift gear determination point according to the throttle opening degree, which is stored by the throttle opening memory storage before the predetermined period from the shift gear determination point.

What is claimed is:

1. A method of controlling a line pressure for an automatic transmission according to at least a vehicle speed and a throttle opening degree, the line pressure varying between shifting and non-shifting, comprising the steps of:

storing the throttle opening degree information in a memory storage;

determining whether shifting is operated or not; and controlling the line pressure according to the stored throttle opening degree before determination of shift.

2. The method of claim 1, wherein the step of controlling comprises controlling the line pressure according to the vehicle speed.

3. The method of claim 1, wherein the step of controlling comprises lowering the line pressure if the throttle opening is low rather than high.

4. The method of claim 1 further comprising the step of determining whether the throttle opening is less than a threshold; and wherein the step of controlling comprises controlling the line pressure according to the determination.

5. The method of claim 4, wherein the step of controlling according to the vehicle speed.

6. The method of claim 4, wherein the step of controlling is characterized by lowering the line pressure if the throttle opening degree is less than the threshold.

7. The method of claim 1, further comprising the step of locating the throttle opening degree by a plurality of dividing values in a full range of the throttle opening degree; and wherein the step of controlling is characterized by controlling the line pressure according to the location.

8. The method of claim 2, further comprising the step of locating the throttle opening degree by a plurality of dividing values in a full range of the throttle opening degree; and wherein the step of controlling is characterized by controlling the line pressure according to the location.

9. The method of claim 3, further comprising the step of locating the throttle opening degree by a plurality of dividing values in a full range of the throttle opening degree; and wherein the step of controlling is characterized by controlling the line pressure according to the location.

10. A hydraulic controller for an automatic transmission including a throttle opening degree sensor, a vehicle speed sensor to detect a vehicle speed, a hydraulic pressure controller which receives a signal from each sensor, and a line pressure solenoid which receives a signal from the hydraulic pressure controller, comprising:

a throttle opening degree memory storage to store throttle opening degree information from the signal of the throttle opening degree sensor; and a line pressure controller controlling a line pressure in shifting according to the throttle opening degree information before a predetermined period from a shift gear determination point.

11. The hydraulic controller of claim 10, wherein the line pressure controller is characterized by controlling the line pressure in shifting further according to a vehicle speed from the vehicle speed sensor.

12. The hydraulic controller of claim 10, further comprising a threshold memory storage to store a predetermined threshold; and wherein the line pressure controller controls the line pressure in shifting according to whether a throttle opening degree is less than the threshold.

13. The hydraulic controller of claim 12 wherein the line pressure controller controls the line pressure according to a vehicle speed from the vehicle speed sensor.

14. The hydraulic controller of claim 12 wherein the threshold memory storage stores a plurality of predetermined thresholds.

15. The hydraulic controller of claim 13 wherein the threshold memory storage stores a plurality of predetermined thresholds.

* * * * *